(12) United States Patent
Michener

(10) Patent No.: US 12,459,323 B2
(45) Date of Patent: Nov. 4, 2025

(54) SHOCK MOUNTED LINEAR SUSPENSION HEIGHT SENSOR WITH ACCELEROMETER

(71) Applicant: Ford Global Technologies, LLC, Dearborn, MI (US)

(72) Inventor: Jason Wallace Michener, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 76 days.

(21) Appl. No.: 18/593,404

(22) Filed: Mar. 1, 2024

(65) Prior Publication Data
US 2025/0276551 A1    Sep. 4, 2025

(51) Int. Cl.
*B60G 17/015* (2006.01)
*B60G 17/019* (2006.01)

(52) U.S. Cl.
CPC ... *B60G 17/0155* (2013.01); *B60G 17/01908* (2013.01)

(58) Field of Classification Search
CPC ....................... B60G 17/0155; B60G 17/01908
See application file for complete search history.

(56) References Cited

U.S. PATENT DOCUMENTS

| | | | | |
|---|---|---|---|---|
| 5,657,840 A | * | 8/1997 | Lizell | B60G 17/018 188/266.5 |
| 6,142,026 A | * | 11/2000 | Ohashi | B60C 23/061 701/65 |
| 9,702,349 B2 | | 7/2017 | Anderson et al. | |
| 10,036,443 B2 | | 7/2018 | Galasso et al. | |
| 11,537,120 B2 | * | 12/2022 | Raeis Hosseiny | G06F 3/04847 |
| 2004/0140642 A1 | * | 7/2004 | Perello | B62D 7/18 280/124.147 |
| 2006/0124413 A1 | * | 6/2006 | Namuduri | F16F 9/535 188/267 |
| 2008/0264743 A1 | * | 10/2008 | Lee | F16F 9/535 188/266 |
| 2009/0071772 A1 | * | 3/2009 | Cho | G01R 33/093 701/37 |
| 2009/0112402 A1 | * | 4/2009 | Furuichi | B60G 17/016 701/37 |

(Continued)

FOREIGN PATENT DOCUMENTS

EP    3290738 A1    3/2018

*Primary Examiner* — Long T Tran
(74) *Attorney, Agent, or Firm* — Burr & Forman; Lorne Forsythe (57) ABSTRACT

A sensor assembly for a suspension assembly of a vehicle may include a sensor for detecting displacement data of a target magnet and a sensor casing operably coupled to an external body of a shock absorber of the suspension assembly and the sensor. The sensor may include a linear flexible printed circuit that may be disposed along a longitudinal axis of the shock absorber to measure displacement data of the target magnet relative to the shock absorber to determine the suspension assembly position. The sensor assembly may further include a single axis accelerometer measuring rate of change of suspension velocity data in a direction along the longitudinal axis of the shock absorber, and the target magnet operably coupled to the suspension assembly via a suspension assembly component other than the external body of the shock absorber.

20 Claims, 6 Drawing Sheets

(56) References Cited

U.S. PATENT DOCUMENTS

| | | | |
|---|---|---|---|
| 2011/0022265 A1* | 1/2011 | Sekiya | B60G 17/08 |
| | | | 701/37 |
| 2014/0288776 A1* | 9/2014 | Anderson | F16F 9/064 |
| | | | 701/37 |
| 2021/0291832 A1* | 9/2021 | Simmons | B60K 35/28 |
| 2022/0242190 A1* | 8/2022 | Stanford | B60G 13/14 |
| 2022/0389983 A1 | 12/2022 | Cox et al. | |
| 2023/0158850 A1 | 5/2023 | Hwang et al. | |
| 2024/0092135 A1* | 3/2024 | Randall | B60G 17/08 |

* cited by examiner

SHOCK MOUNTED LINEAR SUSPENSION HEIGHT SENSOR WITH ACCELEROMETER

TECHNICAL FIELD

Example embodiments generally relate to vehicle suspension and, more particularly, relate to a suspension system with an integrated shock and suspension height sensor with an accelerometer.

BACKGROUND

Vehicles commonly employ an independent suspension that allows each wheel to move relative to the vehicle chassis independent of the other wheels. The components and geometries used for independent suspension designs can vary to some degree. However, a typical independent suspension system will employ dampers or shock absorbers (or simply "shocks") that are designed to provide damping for pitch (i.e., oscillation about a lateral axis of the vehicle), heave and roll, as well as individual wheel contacts. The shocks generally resist compression and rebound with damping forces that are applied over a range of travel of a piston rod.

The shocks selected for a particular vehicle are generally chosen based on the expectation of normal vehicle dynamics scenarios that are encountered during routine driving conditions. Some typical suspension components that may be considered for selection include springs and dampers (e.g., gas shocks). Moreover, some shocks employ what is referred to as a coil-over design in which a coil spring is provided coaxial with the damper such that the damper is inside the coil spring. Many modern vehicles utilize semi-active or active suspensions to continuously modify damping levels of a vehicle's suspension system using shock absorbers. To accurately modify damping and identify shock absorber condition, wheel position and rate of change of suspension velocity are needed.

Thus, it may be desirable to be able to include an easily installed sensor assembly to accurately and quickly measure wheel position and rate of change of suspension velocity.

BRIEF SUMMARY OF SOME EXAMPLES

In accordance with an example embodiment, a sensor assembly for a suspension assembly of a vehicle may be provided. The sensor assembly may include a sensor for detecting displacement data of a target magnet and a sensor casing operably coupled to an external body of a shock absorber of the suspension assembly and the sensor. The sensor may include a linear flexible printed circuit that may be disposed along a longitudinal axis of the shock absorber to measure displacement data of the target magnet relative to the shock absorber to determine the suspension assembly position. The sensor assembly may further include a single axis accelerometer measuring rate of change of suspension velocity data in a direction along the longitudinal axis of the shock absorber, and the target magnet operably coupled to the suspension assembly via a suspension assembly component other than the external body of the shock absorber.

In yet another example embodiment, a suspension system for a vehicle may be provided. The suspension assembly may include a shock absorber operably coupled to a wheel assembly and a chassis of the vehicle, and a sensor assembly operably coupled to the shock absorber. The sensor assembly may include a sensor for detecting displacement data of a target magnet, a sensor casing operably coupled to an external body of the shock absorber of the suspension assembly and the sensor. The sensor may include a linear flexible printed circuit that may be disposed along a longitudinal axis of the shock absorber to measure displacement data of the target magnet relative to the shock absorber to determine the suspension assembly position. The sensor assembly further include a single axis accelerometer measuring rate of change of suspension velocity data in a direction along the longitudinal axis of the shock absorber, and the target magnet operably coupled to the suspension assembly via a suspension assembly component other than the external body of the shock absorber.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein may address the issues described above. In this regard, for example, some embodiments may provide a more efficient shock or suspension assembly design that employs position sensors that are configured to measure ride height into existing components. Some embodiments may provide for a target magnet that may be installed on a first suspension component (e.g., a piston assembly), and a position sensor (e.g., in the form of an elongated printed circuit board (PCB) with wiring assemblies thereon) that is provided on another suspension component that moves in a linear fashion (e.g., an external body of a shock absorber). As a result, movement of the first and second suspension components relative to each other (displacement) may be measured and converted into information on ride height (position) based on such movement to effectively instantiate an integrated ride height sensor that is relatively simple in construction, but also accurate in operation.

Figure 1:
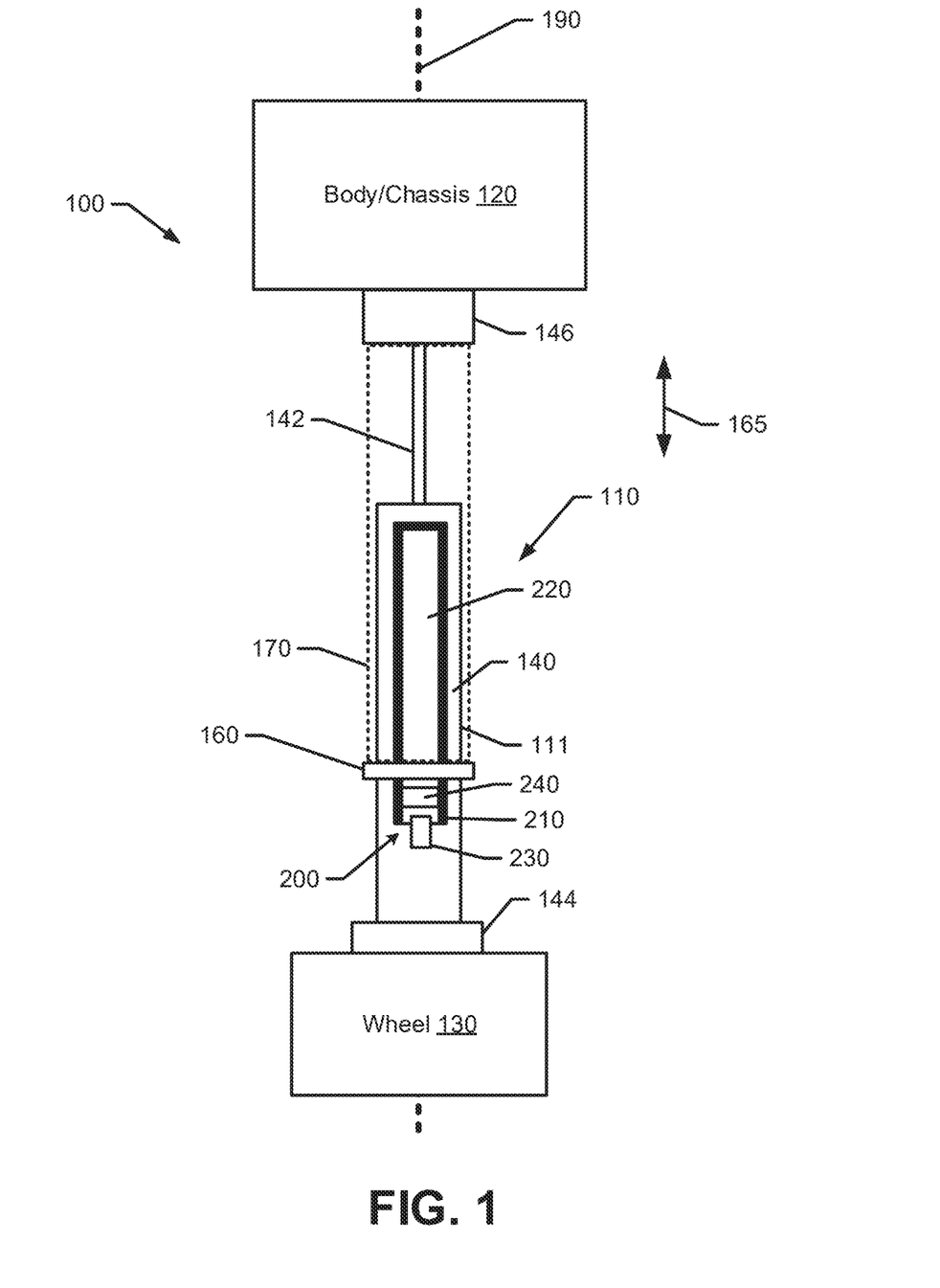
FIG. 1 illustrates a block diagram of a portion of a vehicle suspension system in accordance with an example embodiment.
Figure 2:
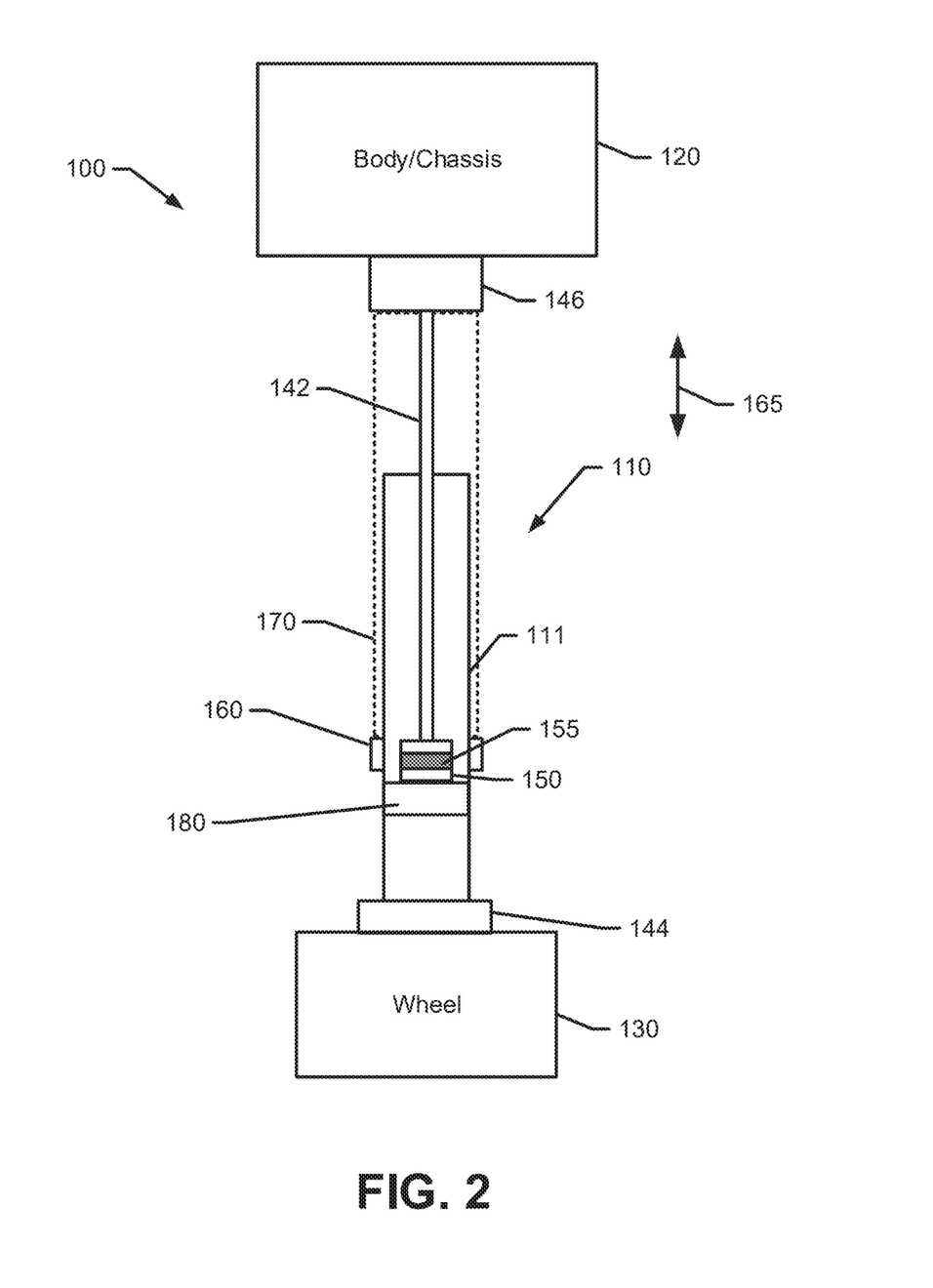
FIG. 2 shows a block diagram of internal components in a portion of a vehicle suspension system in accordance with an example embodiment.

FIG. 1 illustrates a block diagram of a suspension assembly 100 employing a shock absorber 110. FIG. 2 shows a block diagram of some internal components of the shock absorber 110 of a vehicle suspension system. The suspension assembly 100 may employ the shock absorber 110 to dampen jounce and rebound forces that may be initiated between a body or chassis 120 of the vehicle and a wheel 130 (or wheel assembly components). In some cases, the chassis may include or be defined by a frame, and the frame may additionally be formed of one or more casted subframes. In this regard, the shock absorber 110 may operably couple the chassis 120 to the wheel 130. The shock absorber 110 may include a strut module or damper tube 140 with a rod 142 that extends into the damper tube 140. The damper tube 140 may be operably coupled to the wheel 130 via a first mechanical interface 144. The rod 142 may be operably coupled to the body chassis 120 via a second mechanical interface 146. In some cases, the first mechanical interface 144 and the second mechanical interface 146 may be a ball and socket, a screw, a nut and bolt, or any other interface that securely operably couples the components. The rod 142 may also be operably coupled to the damper tube 140 in such a way as to resist movement of the rod 142 via gas, fluid, springs, or other damping media that may be disposed within the damper tube 140.

The rod 142 may be a component of a piston assembly. The piston assembly may include a piston head 180. The piston head 180 may be operably coupled to the rod 142 and the damper tube 140. The piston head 180 may have a variety of constructions or shapes depending on the shock absorber 110. In some cases, the piston head 180 may have a plurality of apertures to allow damping media to travel through the piston head 180. In an example embodiment, the piston head 180 may form a complete seal between an internal wall of the damper tube 140 and the external edge of the piston head 180 with the damper tube 140.

As the suspension assembly 100 encounters compression and extension due to jounce and rebound associated with traversing uneven surfaces, the rod 142 may be plunged further into the damper tube 140 and alternately extend farther out of the damper tube 140, respectively, relative to the position shown in FIG. 1. In some cases, both the damper tube 140 and the rod 142 may move relative to one another in a movement direction represented by the double arrow 165. By measuring the displacement along the movement direction, it may be possible to determine ride height or position for the corresponding wheel or corner of a vehicle employing the suspension assembly 100.

As noted above, some complicated designs are already in place to try to measure this movement. However, such designs add many parts to those generally shown in FIG. 1, and are therefore complicated and inefficient to employ. Moreover, many such designs do not provide linear outputs that are reliably accurate. Meanwhile, example embodiments may integrate measurement components into the components shown in FIG. 1 to provide quick and accurate ride height measurement for the suspension assembly 100.

In this regard, as shown in FIG. 1, a sensor assembly 200 may be installed in or attached to the shock absorber 110. The sensor assembly 200 may include a sensor casing 210 and a linear sensor 220. The sensor casing 210 may operably couple the linear sensor 220 to an external body 111 of the shock absorber 110. In some cases, if the shock absorber 110 is a single tube shock absorber, the external body 111 may be specifically the external side of the damper tube 140. In an example embodiment, a target magnet 155 may, for example, generate a magnetic field that is of a known magnitude, and at a known location (i.e., at the corresponding portion of the shock absorber 110, and at a fixed position relative to a component of the suspension assembly 100). In some cases, the target magnet 155 may be within the damper tube 140 or may be operably coupled to an external component of the suspension assembly 100. The target magnet 155 may be any device or object that generates a known magnetic field. In an example embodiment, the target magnet 155 may be operably coupled to any component of the suspension assembly, as long as its position may be known. In some cases, a rebound stop 150 may be operably coupled to the piston head 180 to help assist in force control within the shock absorber 110, and specifically the damper tube 140. In an example embodiment, the rebound stop 150 may include the target magnet 155 for the linear sensor 220 of the sensor assembly 200. The inclusion of the target magnet 155 within the rebound stop 150 may allow for assembly of the sensor assembly 200 onto the shock absorber 110 without altering piston dynamics. In this regards, the shock absorber 110 calibration may not be affected and may allow for calibration and tuning of the shock absorber 110 prior to sensor assembly 200 instillation and shock absorber 110 instillation.

Meanwhile, the linear sensor 220 may be disposed along a length of the external body 111. In some cases, the linear sensor 220 may be disposed along a longitudinal axis 190 of the shock absorber 110. In an example embodiment, the linear sensor 220 may be disposed along longitudinal axis 190 of the external body 111 of the shock absorber 110. As the rod 142 (and the piston head 180, the rebound stop 150, and thus the target magnet 155) may move up or down responsive to jounce and rebound, the location of the target magnet 155 correspondingly moves relative to the linear sensor 220. In some cases, as the external body 111 (and the damper tube 140) may move up or down responsive to jounce and rebound, the location of the linear sensor 220 correspondingly moves relative to the target magnet 155. The linear sensor 220 may be configured to track such movement and ride height information may correspondingly be determined based on such movement.

Figure 3:
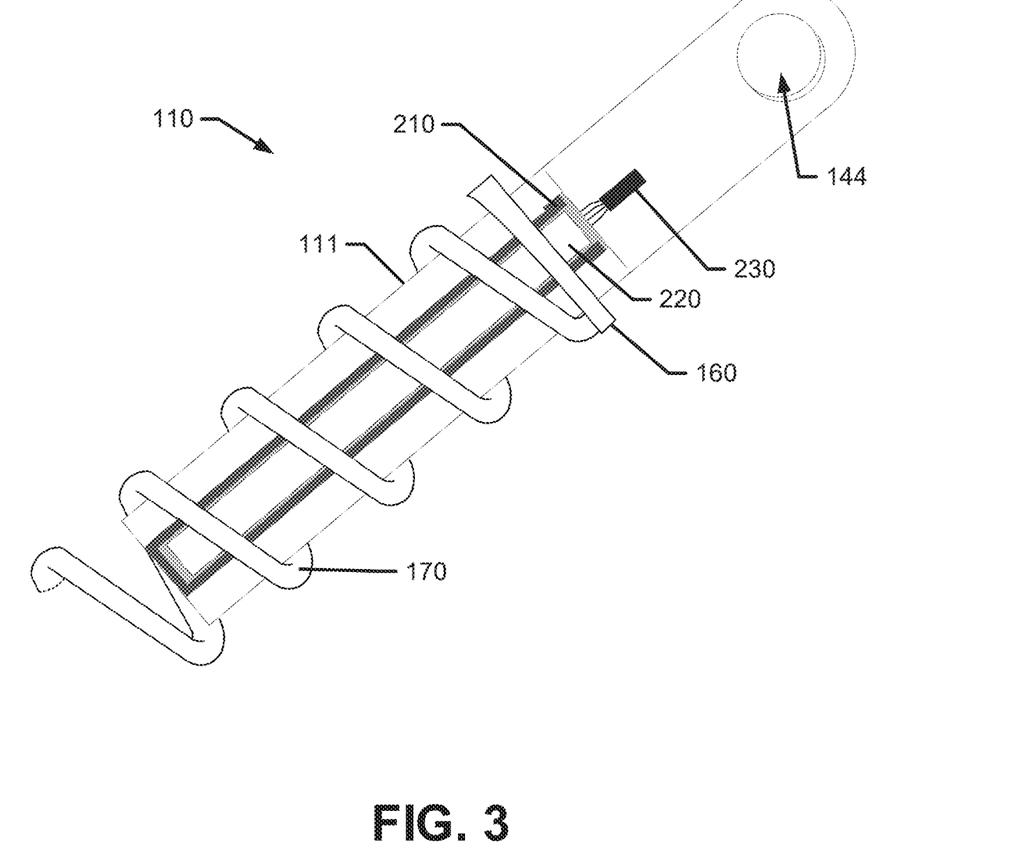
FIG. 3 illustrates a perspective view of a vehicle suspension system in accordance with an example embodiment.

In an example embodiment, the linear sensor 220 may be embodied as and may include an elongated PCB 222 that extends along a surface of the external body 111, as shown in FIG. 3. Moreover, in some cases, the PCB 222 may include, carry or be in communication with a wiring assembly or connector assembly 230. The connector assembly 230 may be a traditional over-molded integrated circuit that may include various connectors, logic circuits, additional sensors, and transceivers. The connector assembly 230 may have a current run therethrough, and the current may generate a corresponding magnetic field. The magnetic field generated by the connector assembly 230 may be interacted with by the magnetic field of the target magnet 155. For example, the target magnet 155 may distort the magnetic field generated by the connector assembly 230. The distortion or modification of the magnetic field of the connector assembly 230 may be measured/monitored by the PCB 222 of the linear sensor 220, and a corresponding ride height information determination may be made by the PCB 222 (or another processing component operably coupled thereto) based on the displacement or position (displacement data) of the target magnet 155.

In some cases, coil-over springs may be further added to enhance such resistance. A coil-over spring 170 may be operably coupled to the suspension assembly via an upper spring mounting member and a lower spring mounting member 160. In some cases, the upper spring mounting member may be the second mechanical interface 146. In an example embodiment, the lower spring mounting member 160 may be operably coupled to the external body 111.

In an example embodiment, the sensor assembly 200 may include an accelerometer 240. The accelerometer 240 may be a single-axis accelerometer or may be any number of sensors that may accurately determine rate of change of suspension velocity while the vehicle corners or otherwise experiences wheel position changes. In some cases, the accelerometer 240 may be built-in to the linear sensor 220 or may be disposed within the connector assembly 230. In an example embodiment, the accelerometer 240 may be disposed by the piston head 180 or by the rod 142. The accelerometer 240 may be disposed anywhere within the sensor assembly 200 and shock absorber 110 that may accurately determine rate of change of suspension velocity during vehicle cornering or other suspension events.

The accelerometer 240 may determine real-time rate of change of suspension velocity (e.g., along its suspension travel axis), which is the same as or proportional with rate of change of wheel velocity along the longitudinal axis 190. Thus, for example, the position (and rate of change of velocity) of the wheel is measured between positions of full compression and full rebound. Some other suspension systems may utilize position data determined by the position sensor to determine rate of change of suspension velocity of the suspension system or wheel. To determine such rate of change of suspension velocity, a second derivative would typically need to be taken by the position sensor, thus incorporating a delay with the calculation of rate of change of suspension velocity as well as losing accuracy for the calculations. In this regards, integrating an accelerometer 240 into the sensor assembly 200 or shock absorber 110 may allow for quicker and more accurate data for suspension assembly 100 adjustment and condition determination, as position data and rate of change of suspension velocity may both be provided in real-time locally. In an example embodiment, having accurate, real time position, and rate of change of suspension velocity data measured by the accelerometer 240, may allow for accurate, real time force per corner measurements.

In some cases, the rate of change of suspension velocity data from the accelerometer 240 and the displacement data from the linear sensor 220 may be acquired simultaneously and in real time. With simultaneous and real time rate of change of suspension velocity data and displacement data, suspension stroke position may be determined. Suspension stroke position may be defined by where specifically the suspension assembly is disposed at and the direction the suspension assembly may be headed. Identifying the ride height or suspension assembly 100 position using displacement data from the linear sensor 220 by itself may not fully identify whether the shock absorber 110 may be heading towards maximum compression or maximum extension. Rate of change of suspension velocity data from the accelerometer 240 may identify if the shock absorber 110 may be compressing or extending in the direction of movement represented by the double arrow 165. In an example embodiment, the maximum compression of the shock absorber may be indicative of the suspension assembly 100 bottoming out and thus not providing the optimum damping. In some cases, the maximum compression of the shock absorber 110 may be circumvented via adjustment of damping of the shock absorber 110 based on the suspension stroke position determination. If the suspension stroke position is determined to be approaching maximum compression, the damping of the shock absorber 110 may be increased. In an example embodiment, the damping of the shock absorber may be adjusted if the suspension stroke position is determined to be approaching minimum compression.

Furthermore, velocity data may be important for suspension assembly 100 adjustment. With the incorporation of the accelerometer 240 into the shock absorber 110, the sensor assembly 200 may allow for an alternative method for determining velocity data representative of wheel velocity or vehicle corner velocity. The accelerometer 240 may determine velocity data via the integration of the rate of change of suspension velocity measured. Combined, the velocity data that may be obtained via the first derivative of the position data collected from the linear sensor 220 and the velocity data that may be obtained via the integration of the rate of change of suspension velocity data collected by the accelerometer 240 may create a verified set of velocity data that may be more accurate and help to eliminate/reduce velocity error.

Figure 4:
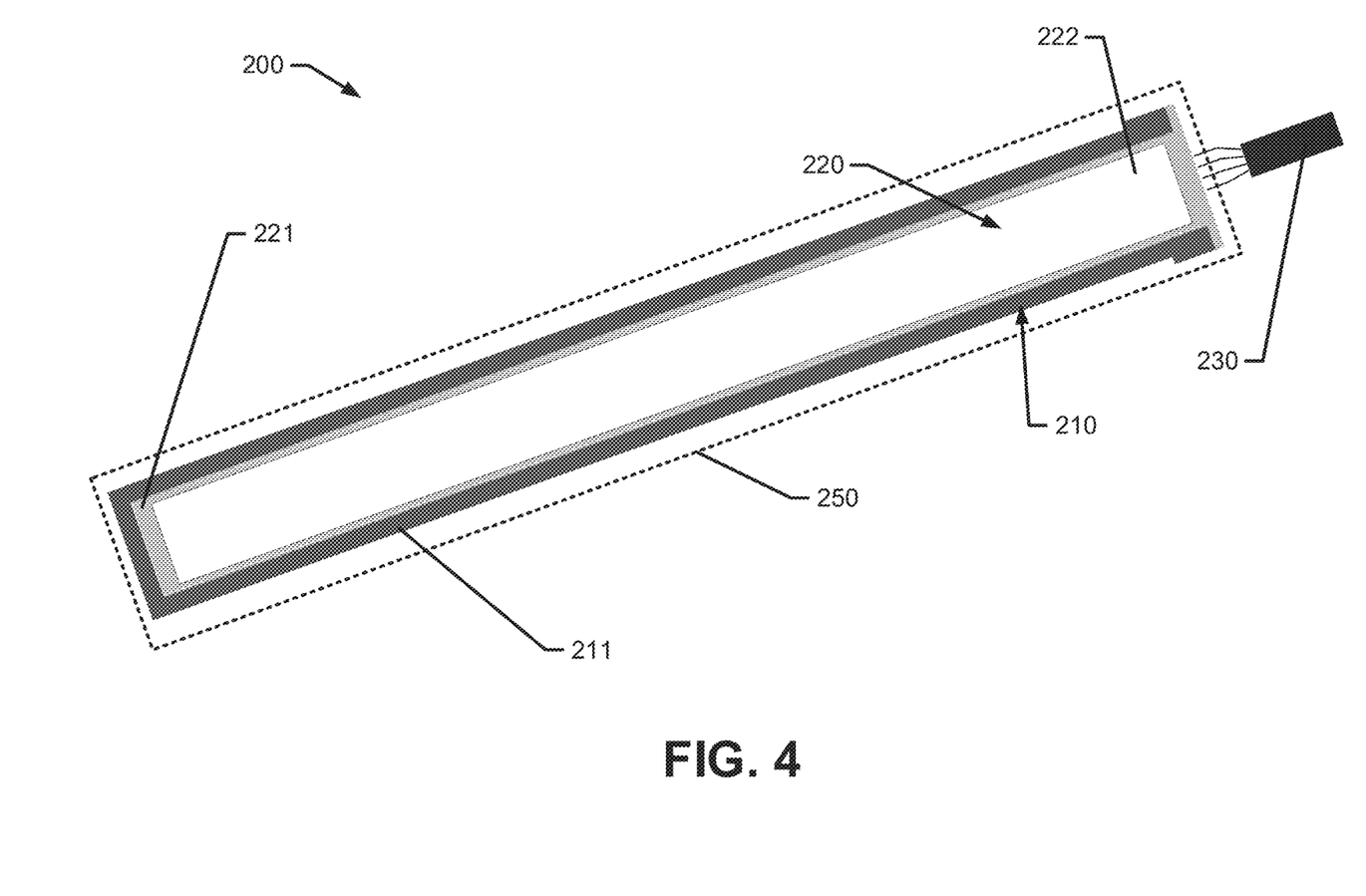
FIG. 4 shows an isolated perspective view of a sensor assembly in accordance with an example embodiment.
Figure 5:
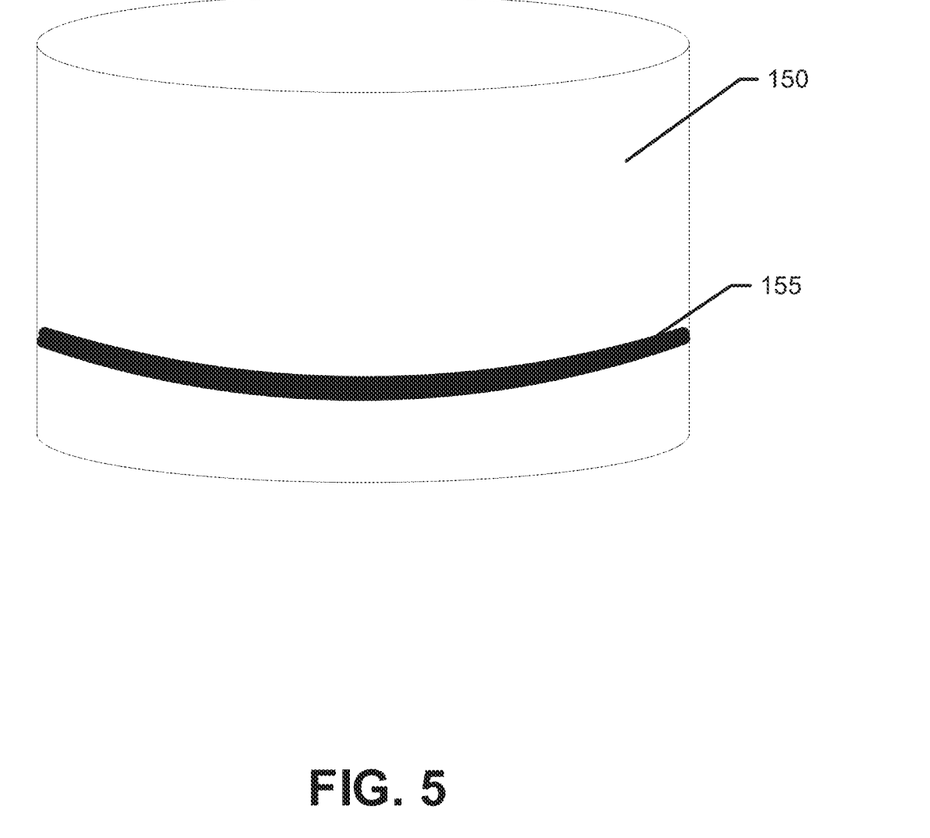
FIG. 5 illustrates an isolated perspective view of a rebound stop for a piston in accordance with an example embodiment.
Figure 6:
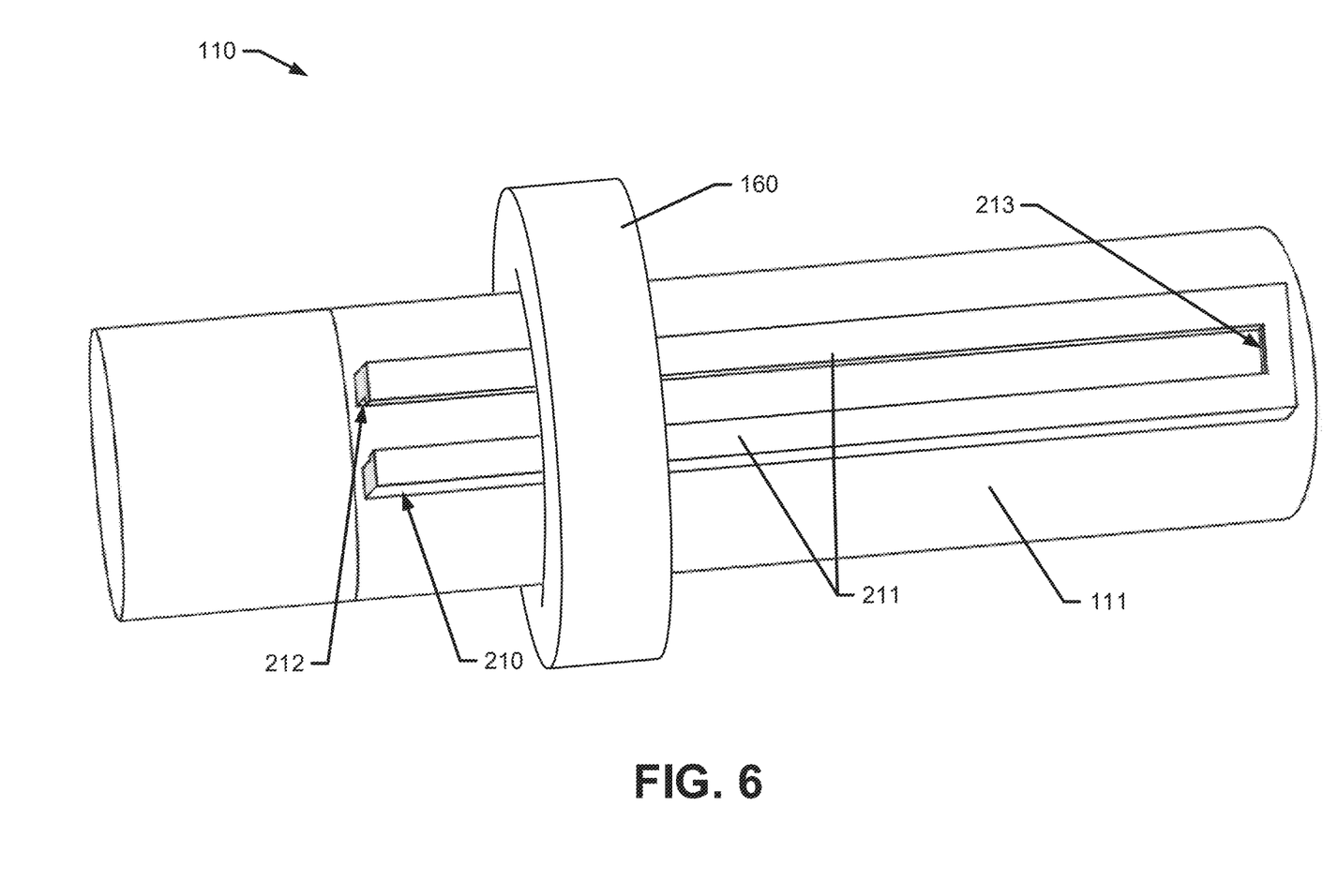
FIG. 6 shows an isolated perspective view of a shock absorber outer body in accordance with an example embodiment.

Referring now to FIGS. 3-6, example embodiments of the suspension assembly 100, the shock absorber 110, and the sensor assembly 200 are illustrated. FIG. 3 illustrates a perspective view of a vehicle suspension system in accordance with an example embodiment. FIG. 4 shows an isolated perspective view of a sensor assembly in accordance with an example embodiment. FIG. 5 illustrates an isolated perspective view of a rebound stop for a piston in accordance with an example embodiment. FIG. 6 further shows an isolated perspective view of a shock absorber for a piston in accordance with an example embodiment.

In some cases, the connector assembly 230 may be the only instance of a connector in the sensor assembly 200. In this regard, all communication signal transferring, power signal transferring, and grounding within the sensor assembly 200 may be accomplished through the single instance of the connector assembly 230. In an example embodiment, a Peripheral Sensor Interface 5 (PSI-5) may be used by the sensor assembly 200 and the connector assembly 230 for signal transfer. With PSI-5, the connector assembly 230 may only need a two wire interface to transfer all necessary information and perform the grounding function. The two wire interface may include a power-in wire and a power-out wire, which streamlines the sensor assembly 200 communication compared to older communication methods requiring more complex wiring. In this regard, PSI-5 may allow for the power-out wire of the connector assembly 230 and sensor assembly 200 to output a single data packet for all necessary data. The single data packet may include any necessary instances of displacement data and rate of change of suspension velocity data, streamlining the sensor assembly 200 communication.

In an example embodiment, the sensor casing 210 may have parallel peripheral edges 211. The parallel peripheral edges may be disposed substantially parallel to the longitudinal axis 190 of the shock absorber 110. In some cases, the parallel peripheral edges 211 may include grooves 212. In this regard, the linear sensor 220 may slide into the grooves 212 of the parallel peripheral edges 211 to operably couple the linear sensor 220 to the sensor casing 210. In some cases, the linear sensor 220 and the sensor casing 210 may operably couple via a tongue and groove configuration or via an alternative groove configuration.

In an example embodiment, the sensor casing 210 may also include a distal support groove 213. The distal support groove 213 may be substantially perpendicular to the parallel peripheral edges 211. In some cases, the distal support groove 213 may operably couple to a distal end of the linear sensor 220. The distal end of the linear sensor 220 may be the end of the linear sensor 220 furthest away from the connector assembly 230. In an example embodiment, the sensor casing 210 only operably couples to the linear sensor 220 via the parallel peripheral edges 211 and the distal support groove 213. In some cases, the sensor casing 210 may be a U-shape, formed via the parallel peripheral edges 211 and the distal support groove 213; however, the sensor casing 210 may be any number of shapes that may operably couple the linear sensor 220 to the shock absorber 110.

In an example embodiment, the linear sensor 220 may include a sensor housing 221. The sensor housing 221 may surround or form an exterior of the linear sensor 220. The sensor housing 221 may operably couple the linear sensor to the sensor casing 210.

In some cases, the suspension assembly 100 may include a sealing member 250. The sealing member 250 may operably couple to the linear sensor 220, the sensor casing 210, and external body 111. In this regard, the sealing member 250 may create a seal between the linear sensor 220 and the sensor casing 210 to shield the linear sensor 220 from external debris. In some cases, the external debris may be rocks, pebbles, sand, rain, fluid, or any other debris that may be encountered by the vehicle during vehicle operation. In an example embodiment, the sealing member 250 may be a decal or other sticker that is attached via an adhesive provided on a contact side thereof. In some cases, the sealing member 250 may be translucent or transparent in order to see sensor assembly 200 components after application of the sealing member 250.

In an example embodiment, the shock absorber 110 may be made of aluminum. In this regard, the material of the shock absorber 110 may not affect inductive detection of the target magnet 155 by the linear sensor 220. In some cases, the shock absorber 110, or more specifically the external body 111, may be any material that does not interfere with inductive detection of the target magnet 155 by the linear sensor 220.

In an example embodiment, the lower spring mounting member 160 of the suspension assembly 100 may include a clearance between the external body 111 of the shock absorber 110 and a portion of the lower spring mounting member 160. In some cases, the components of the sensor assembly 200 (i.e. sensor casing 210 and linear sensor 220) may be disposed within the clearance and this within the inner circumference of the lower spring mounting member 160.

In an example embodiment, the linear sensor 220 may be disposed at, and directly in contact with the external body 111 of the shock absorber 110, in addition to being operably coupled to the sensor casing 210. In some cases, the linear sensor 220 may include an adhesive or the sensor housing 221 may include an adhesive to directly affix the linear sensor 220 to the external body 111. In an example embodiment, the linear sensor 220 and the external body 111 may be secured in contact with one another via welding, an adhesive, or any other method that directly operably couples the linear sensor 220 and the external body 111. In some cases, the sensor casing 210 may be secured via welding, an adhesive, or any other method that directly operably couples the linear sensor 220 and the external body 111. In an example embodiment, the linear sensor 220 and the sensor casing may be operably coupled via mounting screws.

In some cases, the rate of change of suspension velocity data and the displacement data may be utilized to monitor vehicle condition. In an example embodiment, the rate of change of suspension velocity data and the displacement data may assist in determining if the sensor assembly may be in a fault state or if the shock absorber may be in a fault state. In some cases, the rate of change of suspension velocity data and the displacement data may be voltage or current measurements.

In an example embodiment, the shock absorber 110 may include an external cover that may be disposed over the external body 111 of the shock absorber 110. In some cases, the external cover may be operably coupled to the first mechanical interface 144 or the second mechanical interface 146. In an example embodiment, the external cover may include a sheath to hold the linear sensor 220. For example, the linear sensor 220 may be operably coupled to the external cover and the target magnet may be operably coupled an alternative component of the suspension assembly to measure displacement data. In some cases, the shock absorber 110 may be a single body shock absorber or a multiple body shock absorber. In an example embodiment, the linear sensor 220 may be over 50% of a longitudinal length of the external body 111 of the shock absorber 110.

In an example embodiment, the sensor assembly 200 may be used in semi-active or active suspension assemblies. In some cases, if the sensor assembly 200 is used in an active suspension assembly, the displacement data may allow for a proper imparting force to be applied to the shock absorber 110.

In accordance with an example embodiment, a sensor assembly for a suspension assembly of a vehicle may therefore be provided. The sensor assembly may include a sensor for detecting displacement data of a target magnet and a sensor casing operably coupled to an external body of a shock absorber of the suspension assembly and the sensor. The sensor may include a linear flexible printed circuit that may be disposed along a longitudinal axis of the shock absorber to measure displacement data of the target magnet relative to the shock absorber to determine the suspension assembly position. The sensor assembly may further include a single axis accelerometer measuring rate of change of suspension velocity data in a direction along the longitudinal axis of the shock absorber, and the target magnet operably coupled to the suspension assembly via a suspension assembly component other than the external body of the shock absorber.

The sensor assembly of some embodiments may include additional features, modifications, augmentations and/or the like to achieve further objectives or enhance performance of the device. The additional features, modifications, augmentations and/or the like may be added in any combination with each other. Below is a list of various additional features, modifications, and augmentations that can each be added individually or in any combination with each other. For example, the target may include one or more magnets. In an example embodiment, the rate of change of suspension velocity data and the displacement data may be used simultaneously and in real time to detect suspension stroke position. In some cases, a maximum compression of the shock absorber may be circumvented due to adjustment of damping of the suspension assembly based on the suspension stroke position. In an example embodiment, the suspension assembly component may be a rebound stop of a piston of the shock absorber. In some cases, the sensor only may require a single instance of a connector for communication signal transfer, power signal transfer, and grounding within the sensor assembly. In an example embodiment, a single data packet may be sent through the connector comprising the rate of change of suspension velocity data and the displacement data. In some cases, the sensor casing may further include parallel peripheral edges. The parallel peripheral edges may include grooves. The sensor may slide into the grooves to operably couple the sensor and the sensor casing. In an example embodiment, the sensor casing may only operably couple to the sensor via the parallel peripheral edges and a distal support groove substantially perpendicular to the parallel peripheral edges. The distal support groove may operably couple to a distal end of the sensor. In some cases, a sealing member may operably couple to the sensor, the sensor casing, and the external body of the shock absorber. The sealing member may create a seal between the sensor and the sensor casing from external debris. In an example embodiment, the external body of the shock absorber may be aluminum. In some cases, the sensor may be disposed within an inner circumference of a spring mounting member of the shock absorber. In an example embodiment, the sensor may be disposed at, and in contact with, the external body of the shock absorber.

In yet another example embodiment, a suspension system for a vehicle may be therefore be provided. The suspension assembly may include a shock absorber operably coupled to a wheel assembly and a chassis of the vehicle, and a sensor assembly operably coupled to the shock absorber. The sensor assembly may include a sensor for detecting displacement data of a target magnet, a sensor casing operably coupled to an external body of the shock absorber of the suspension assembly and the sensor. The sensor may include a linear flexible printed circuit that may be disposed along a longitudinal axis of the shock absorber to measure displacement data of the target magnet relative to the shock absorber to determine the suspension assembly position. The sensor assembly further include a single axis accelerometer measuring rate of change of suspension velocity data in a direction along the longitudinal axis of the shock absorber, and the target magnet operably coupled to the suspension assembly via a suspension assembly component other than the external body of the shock absorber.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed:

1. A sensor assembly for a suspension assembly of a vehicle, the sensor assembly comprising,
   a sensor for detecting displacement data of a target magnet; and
   a sensor casing operably coupled to an external body of a shock absorber of the suspension assembly and the sensor;
   wherein the sensor comprises a linear flexible printed circuit disposed along a longitudinal axis of the shock absorber to measure displacement data of the target magnet relative to the shock absorber to determine a suspension assembly position,
   wherein the sensor assembly further comprises a single axis accelerometer measuring rate of change of suspension velocity data in a direction along the longitudinal axis of the shock absorber, and
   wherein the target magnet operably coupled to the suspension assembly via a suspension assembly component other than the external body of the shock absorber.

2. The sensor assembly of claim 1, wherein the rate of change of suspension velocity data and the displacement data are used simultaneously and in real time to detect suspension stroke position.

3. The sensor assembly of claim 2, wherein a maximum compression of the shock absorber is circumvented due to adjustment of damping of the suspension assembly based on the suspension stroke position.

4. The sensor assembly of claim 1, wherein the suspension assembly component is a rebound stop of a piston of the shock absorber.

5. The sensor assembly of claim 1, wherein the sensor only requires a single instance of a connector for communication signal transfer, power signal transfer, and grounding within the sensor assembly.

6. The sensor assembly of claim 5, wherein a single data packet is sent through the connector comprising the rate of change of suspension velocity data and the displacement data.

7. The sensor assembly of claim 1, wherein the sensor casing further comprises parallel peripheral edges,
   wherein the parallel peripheral edges further comprise grooves,
   and wherein the sensor slides into the grooves to operably couple the sensor and the sensor casing.

8. The sensor assembly of claim 7, wherein the sensor casing only operably couples to the sensor via the parallel peripheral edges and a distal support groove substantially perpendicular to the parallel peripheral edges, and
   wherein the distal support groove operably couples to a distal end of the sensor.

9. The sensor assembly of claim 1, wherein a sealing member operably couples to the sensor, the sensor casing, and the external body of the shock absorber, and
   wherein the sealing member creates a seal between the sensor and the sensor casing from external debris.

10. The sensor assembly of claim 1, wherein the external body of the shock absorber is aluminum.

11. The sensor assembly of claim 1, wherein the sensor is disposed within an inner circumference of a spring mounting member of the shock absorber.

12. The sensor assembly of claim 1, wherein the sensor is disposed at, and in contact with, the external body of the shock absorber.

13. A suspension assembly of a vehicle, the suspension assembly comprising,
a shock absorber operably coupled to a wheel assembly and a chassis of the vehicle; and
a sensor assembly operably coupled to the shock absorber, the sensor assembly further comprising:
a sensor for detecting displacement data of a target magnet; and
a sensor casing operably coupled to an external body of the shock absorber of the suspension assembly and the sensor;
wherein the sensor comprises a linear flexible printed circuit disposed along a longitudinal axis of the shock absorber to measure displacement data of the target magnet relative to the shock absorber to determine a suspension assembly position,
wherein the sensor assembly further comprises a single axis accelerometer measuring rate of change of suspension velocity data in a direction along the longitudinal axis of the shock absorber, and
wherein the target magnet operably coupled to the suspension assembly via a suspension assembly component other than the external body of the shock absorber.

14. The suspension assembly of claim 13, wherein the rate of change of suspension velocity data and the displacement data are used simultaneously and in real time to detect suspension stroke position.

15. The suspension assembly of claim 14, wherein a maximum compression of the shock absorber is circumvented due to adjustment of damping of the suspension assembly based on the suspension stroke position.

16. The suspension assembly of claim 13, wherein the suspension assembly component is a rebound stop of a piston of the shock absorber.

17. The suspension assembly of claim 13, wherein the sensor only requires a single instance of a connector for communication signal transfer, power signal transfer, and grounding within the sensor assembly.

18. The suspension assembly of claim 17, wherein a single data packet is sent through the connector comprising the rate of change of suspension velocity data and the displacement data.

19. The suspension assembly of claim 13, wherein the sensor casing further comprises parallel peripheral edges,
wherein the parallel peripheral edges further comprise grooves,
and wherein the sensor slides into the grooves to operably couple the sensor and the sensor casing.

20. The suspension assembly of claim 19, wherein the sensor casing only operably couples to the sensor via the parallel peripheral edges and a distal support groove substantially perpendicular to the parallel peripheral edges, and
wherein the distal support groove operably couples to a distal end of the sensor.

* * * * *